US012384014B2

(12) United States Patent
Gong et al.

(10) Patent No.: US 12,384,014 B2
(45) Date of Patent: Aug. 12, 2025

(54) HOOK ASSEMBLY FOR POWER TOOL

(71) Applicant: Hilti Aktiengesellschaft, Schaan (LI)

(72) Inventors: Mengan Gong, Landsberg am Lech (DE); Mike Yang, Shanghai (CN); Evan Zhou, Shanghai (CN); Elin Zhang, Shanghai (CN)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/259,485

(22) PCT Filed: Nov. 25, 2021

(86) PCT No.: PCT/EP2021/082956
§ 371 (c)(1),
(2) Date: Jun. 27, 2023

(87) PCT Pub. No.: WO2022/144132
PCT Pub. Date: Jul. 7, 2022

(65) Prior Publication Data

US 2024/0058938 A1 Feb. 22, 2024

(30) Foreign Application Priority Data

Dec. 29, 2020 (CN) ......................... 202011588036.8

(51) Int. Cl.
*B25F 5/02* (2006.01)
*B25F 5/00* (2006.01)
*B25H 3/00* (2006.01)

(52) U.S. Cl.
CPC .................. *B25F 5/02* (2013.01); *B25F 5/00* (2013.01); *B25H 3/00* (2013.01)

(58) Field of Classification Search
CPC ..... B25F 5/02; B25F 5/00; B25H 3/00; F21V 21/08
USPC ........................................................ 248/690
See application file for complete search history.

(56) References Cited

U.S. PATENT DOCUMENTS 4,895,336 A * 1/1990 Lieberman ................ B27B 9/00 30/388
5,850,698 A 12/1998 Hurn et al.
6,062,449 A * 5/2000 Kahn ...................... A45F 5/021 224/904

(Continued)

FOREIGN PATENT DOCUMENTS

CN 1705539 A 12/2005
CN 101734434 A 6/2010

(Continued)

OTHER PUBLICATIONS

PCT/EP2021/082956, International Search Report dated Mar. 4, 2022 (Three (3) pages).

*Primary Examiner* — Taylor Morris
(74) *Attorney, Agent, or Firm* — Crowell & Moring LLP

(57) ABSTRACT

A hook assembly for a power tool includes a connection shaft having a first end and a second end opposite each other. The first end of the connection shaft is connectable to a housing of the power tool, the second end is connected to a hook member, and the hook member has a handle part and a hook part extending from the handle part. The hook member has a first position and a second position opposite the first position and the hook member is rotatable around a central axis of the connection shaft when in the second position.

3 Claims, 4 Drawing Sheets

(56) References Cited

U.S. PATENT DOCUMENTS

| | | | | |
|---|---|---|---|---|
| 6,325,577 | B1 | 12/2001 | Anderson | |
| 6,679,406 | B2 * | 1/2004 | Sakai | B25B 23/045 224/904 |
| 6,986,538 | B1 * | 1/2006 | Ecker | B25H 3/00 206/349 |
| 7,111,364 | B2 * | 9/2006 | Bader | B25F 5/02 224/268 |
| 7,222,767 | B1 | 5/2007 | Yang | |
| 7,306,052 | B2 * | 12/2007 | Vahabi-Nejad | B25C 7/00 173/217 |
| 7,823,256 | B2 * | 11/2010 | Engelfried | B25F 5/026 16/426 |
| 8,087,556 | B2 | 1/2012 | Oomori et al. | |
| 8,166,614 | B2 * | 5/2012 | Martin | B25F 5/026 16/422 |
| 8,186,018 | B2 * | 5/2012 | Martin | B25F 5/026 16/436 |
| 8,308,034 | B2 * | 11/2012 | Shibata | B25F 5/02 224/904 |
| 9,360,177 | B2 * | 6/2016 | Mueckl | F21V 21/06 |
| 9,398,807 | B2 * | 7/2016 | Kung | A47G 25/1457 |
| 11,559,879 | B2 * | 1/2023 | Machida | A45F 5/00 |
| 11,684,985 | B2 * | 6/2023 | Nakashima | B23D 45/16 30/388 |
| 11,772,254 | B2 * | 10/2023 | Machida | B25F 5/006 173/171 |
| 2003/0159843 | A1 | 8/2003 | Sakai et al. | |
| 2010/0176015 | A1 | 7/2010 | Manero et al. | |
| 2014/0112702 | A1 * | 4/2014 | Mighells | F16C 11/10 403/92 |
| 2015/0040408 | A1 | 2/2015 | Francis et al. | |
| 2020/0164499 | A1 * | 5/2020 | Zhou | F16B 45/008 |
| 2024/0058938 | A1 | 2/2024 | Gong et al. | |

FOREIGN PATENT DOCUMENTS

| | | | | | |
|---|---|---|---|---|---|
| CN | 105899338 | A | | 8/2016 | |
| CN | 108340015 | A | | 7/2018 | |
| CN | 212042945 | U | | 12/2020 | |
| DE | 20220433 | U1 | * | 8/2003 | B25F 5/02 |
| EP | 1 925 404 | A2 | | 5/2008 | |
| EP | 2022607 | A2 | * | 2/2009 | B25F 5/02 |
| JP | H09140545 | A | | 6/1997 | |
| JP | 2002-144256 | A | | 5/2002 | |
| JP | 2003/165071 | A | | 6/2003 | |
| JP | 2004174646 | A | * | 6/2004 | |
| JP | 3740694 | B2 | * | 2/2006 | B25B 21/02 |
| KR | 101160784 | B1 | * | 6/2012 | B25F 5/02 |
| WO | WO 2004/048046 | A1 | | 6/2004 | |
| WO | WO 2022/144132 | A1 | | 7/2022 | |
| WO | WO-2023020744 | A1 | * | 2/2023 | B25F 5/02 |

* cited by examiner

HOOK ASSEMBLY FOR POWER TOOL

BACKGROUND AND SUMMARY OF THE INVENTION

The present invention relates to a power tool, in particular to a hook assembly for hanging a power tool.

It is well known that hangers (such as hooks) are already used in all kinds of power tools, to enable such power tools to be hung on another hook, protrusion, bar or other similar object arranged on a wall, workbench or operator's belt. In the prior art, patent document CN105899338A has disclosed a dual-axis hook assembly for a power tool; the hook assembly can be incorporated into a housing of a power tool, to enable the tool to be hung from a hook or bar when not in use. The hook assembly has a dual-axis design, so that a hook element can be positioned near or adjacent to a body of the tool, for minimum hindrance to the tool when in use. When the tool is not being used, the hook element can extend outward from the body of the tool and can be oriented in multiple directions to facilitate hanging of the tool.

However, the hook assembly disclosed in the abovementioned patent document has an extremely complex structure; the directions in which the hook assembly can rotate are defined to be around two intersecting axes, and the angle of the hook assembly relative to the tool is limited. Moreover, in the solution disclosed in the above patent, it is only possible to adjust the position and direction of the hook within a specific angular range according to the position of a slot thereof.

Thus, there are problems in the prior art, specifically a limited angle and insufficient flexibility and convenience when a hook assembly is used to hang a power tool.

The technical problem to be solved by the present invention is to provide a hook assembly for a power tool, that is capable of flexible adjustment of the angle of a hook relative to a power tool, and capable of automatic adjustment of a hanging angle under the action of the weight of the power tool itself, thereby ensuring the safety and stability of the power tool when hung.

To solve the abovementioned technical problem, the technical solution of the present invention is as follows: a hook assembly for a power tool, the power tool comprising a housing, the hook assembly being attached to the housing of the power tool, the hook assembly comprising a connection shaft having a first end and a second end opposite each other, the first end of the connection shaft being connected to the housing of the power tool, the second end being connected to a hook member, and the hook member comprising a handle part and a hook part extending from the handle part; the hook member has a first position and a second position opposite the first position, and the hook member can rotate around a central axis of the connection shaft when in the second position.

The first position is a position of the hook member when in a closed state, and the second position is an initial position of the hook member when in an open state.

According to an embodiment of the present invention, the hook member is rotatable between the first position and second position thereof. Preferably, the handle part of the hook member is connected at one end thereof to the second end of the connection shaft by means of a pin, wherein the handle part can rotate from the first position to the second position around the pin. More preferably, the first position and second position are centrosymmetric with respect to the pin.

According to another embodiment of the present invention, the hook assembly further comprises a support member, the support member surrounding the second end substantially in a circumferential direction, and having at least two limiting openings, respectively configured to clamp the handle part in the first position or second position.

According to another embodiment of the present invention, between the first end and second end, the connection shaft further comprises at least one lug extending radially outward from a part of a circumferential surface of the connection shaft, the housing has reserved thereon a mounting channel and a holding part, the first end and lug of the connection shaft pass through the mounting channel and are received in the holding part, and an elastic component is provided between the first end and the holding part.

Preferably, the mounting channel is provided with at least one groove capable of accommodating the lug to pass through, the holding part has a mounting hole for accommodating the first end, and a hole opening of the mounting hole is provided with an axially extending stop part at a position corresponding to the groove.

According to a preferred embodiment of the present invention, at least one slot is defined at an edge of the mounting channel at a housing interior side; once the lug has passed through the groove, the connection shaft is rotated such that the lug is received in the slot. Preferably, the slot is multiple slots, defining multiple different angular positions of the hook member relative to the central axis of the connection shaft, wherein the position of one slot corresponds to the first position of the hook member.

The present invention also provides a power tool, comprising a housing, the housing being connected to the hook assembly for a power tool according to any one of the preceding claims, the housing defining the center of gravity of the power tool, and the handle part of the hook member substantially coinciding with the center of gravity of the power tool when the power tool is hung up.

A power tool can be hung in a desired position flexibly and conveniently by means of the hook assembly for a power tool according to the present invention. When the hook member is at the first position in the closed state, the hook assembly will not hinder the process of using the tool, and is effectively integrated with the power tool. When the tool is not in use, the hook member is rotated to the initial position in the open state, i.e., the second position, at which time the hook member can rotate flexibly and conveniently around the central axis of the connection shaft connected to a housing handle part, through an angle that is adjustable, i.e., rotate through any angle within a certain range, thereby achieving flexible and convenient adjustment of a hanging angle, and can automatically adjust a hanging direction and position according to the center of gravity of the power tool.

The embodiments mentioned can be better understood through the following detailed description while perusing the accompanying drawings. It is emphasized that the various components are not necessarily drawn to scale. In fact, dimensions can be enlarged or reduced at will for the purposes of clear discussion. In the drawings, identical reference labels denote identical elements.

DETAILED DESCRIPTION OF THE DRAWINGS

A hook assembly for a power tool according to an embodiment of the present invention is described below with reference to FIGS. 1-8.

According to an embodiment of the present invention, a power tool 1 is a handheld circular saw. In an alternative embodiment, a hook assembly 2 of the present invention may be used in any type of power tool, hand tool or tool fitting.

Figure 1:
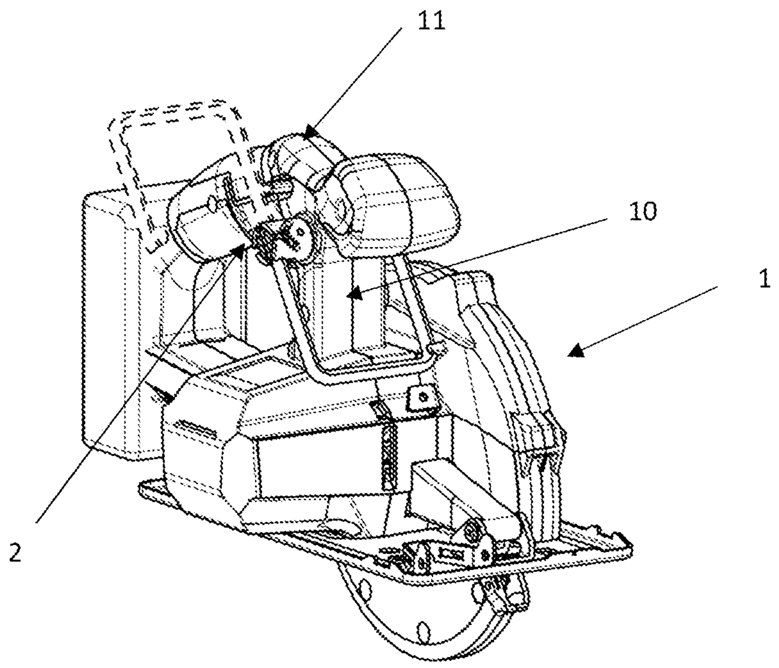
FIG. 1 is a schematic drawing of an operating state in which the hook assembly of the present invention is fitted onto a power tool.

Referring to FIG. 1, the power tool 1 comprises a housing 10 having a handle part; the hook assembly 2 is attached to the housing 10 of the power tool 1. The position of the hook assembly 2 depends on the type of power tool, the weight distribution of the tool, the position of the handle, and other factors. In the embodiments shown in FIGS. 1-7, the hook assembly 2 is arranged on a part of the housing 10 that is close to a front end of the handle 11.

Figure 2:
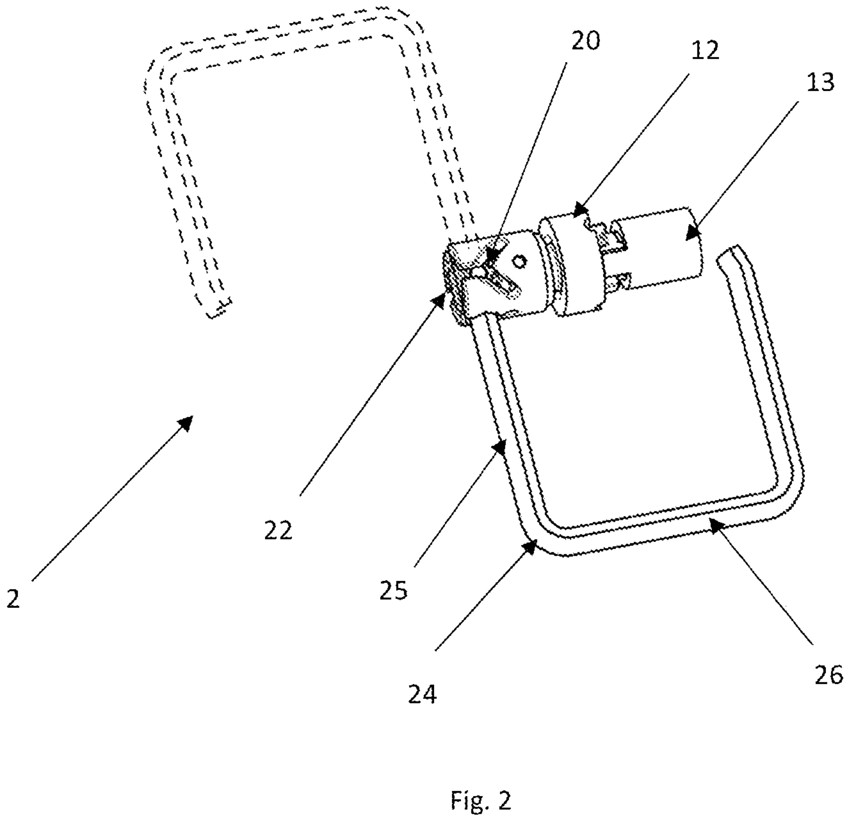
FIG. 2 is perspective view of an embodiment of the hook assembly according to the present invention.
Figure 3:
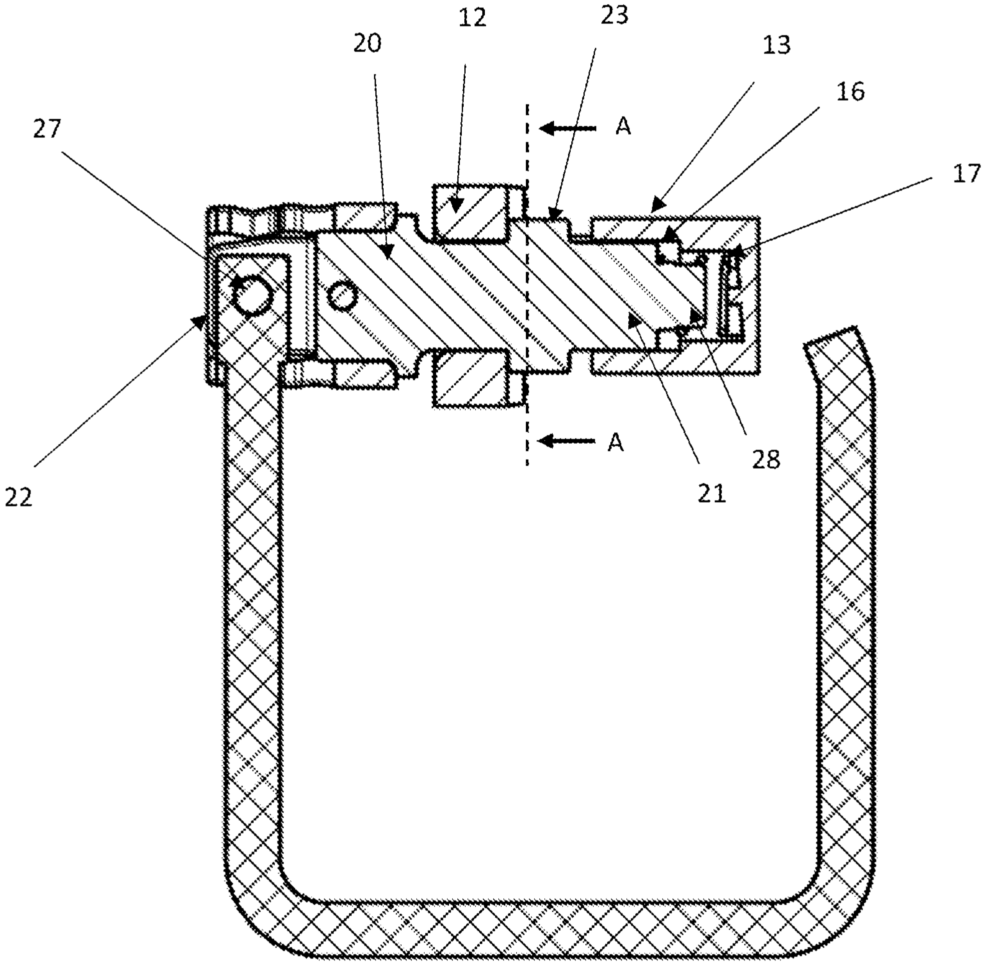
FIG. 3 is a sectional view of the hook assembly shown in FIG. 2.
Figure 4:
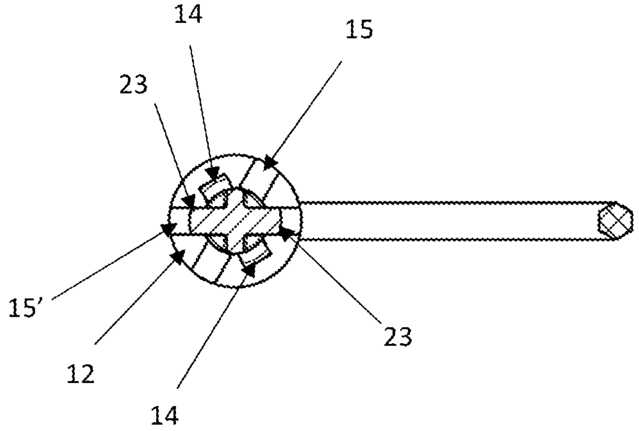
FIG. 4 is a sectional view taken along line A-A of the hook assembly shown in FIG. 3.

According to an embodiment of the present invention, referring to FIGS. 2, 3 and 4, the housing 10 of the power tool is provided with a mounting channel 12 for accommodating and supporting the connection shaft and a holding part 13 for receiving one end of the connection shaft. The hook assembly 2 comprises a connection shaft 20 having a first end 21 and a second end 22 which are opposite each other; the first end 21 of the connection shaft is connected to the housing 10 of the power tool, and the second end 22 is connected to a hook member 24. Preferably, between the first end 21 and the second end 22, the connection shaft 20 further comprises at least one a lug 23, which extends radially outward from a part of a circumferential surface of the connection shaft 20. More preferably, the lug 23 comprises two lugs, arranged symmetrically along a central axis of the connection shaft.

As shown in FIG. 4, the mounting channel 12 is provided with a groove 14 capable of accommodating the lug 23 of the connection shaft 20 to pass through. Preferably, the groove 14 is a pair of grooves 14 extending radially outward from a part of a circumferential surface of the mounting channel 12; the shape and size of the groove correspond to the shape and size of the lug mentioned above, that is to say, the lug 23 can pass through the groove 14. More preferably, at least one slot 15 is defined at an edge of the mounting channel 12 at a housing interior side; once the lug 23 has passed through the groove 14, the connection shaft 20 is rotated such that the lug 23 is accommodated in the slot 15. Preferably, the slot 15 is multiple slots, defining multiple different angular positions of the hook member 24 relative to the central axis of the connection shaft 20, wherein the position of one pair of slots 15' corresponds to a first position of the hook member 24, so as to ensure that the hook member 24 will not randomly rotate around the axis of the connection shaft 24 when in the first position. Preferably, the shape of the slot 15 is substantially smooth, and the slot cannot be too deep; when the hook member 24 is located at a second position, overcoming a biasing force of an elastic component 17, the lug 23 can easily slide in and out of the slot 15, thereby ensuring that the hook member 24 can flexibly rotate around the central axis of the connection shaft. Preferably, the slot is four slots, arranged in pairs symmetrically with respect to the axis center of the connection shaft, wherein one pair of slots is the slots 15' corresponding to the first position of the member 24, and the other pair of slots corresponds to the position of a maximum rotation angle required by the hook member. More preferably, the slot 15 is disposed at a position approximately 30-45 degrees from the groove 14 close thereto. In an alternative embodiment, a greater number of slots may be arranged around the rotation axis.

The holding part 13 substantially comprises a mounting hole 16 for receiving the first end 21 of the connection shaft; an elastic component 17 is provided between the first end 21 and the holding part 13. The size and shape of the mounting hole 16 are designed to be adapted to the first end 21 of the connection shaft, and configured to allow rotational movement and axial movement of the first end 21 in the mounting hole 16. Preferably, the connection shaft 20 further comprises a head 28 extending along an axis of the first end 21 and having a reduced diameter; the elastic component 17 is fitted round the head 28, and supported between the first end and the bottom of the mounting hole 16. The elastic component 17, for example a compression spring, provides a biasing force, for the purpose of keeping the lug 23 of the connection shaft 20 able to abut the interior of the slot 15. More preferably, a hole opening of the mounting hole 16 is provided with an axially extending stop part 18 at a position corresponding to the groove 14. The stop part 18 is configured such that when the lug 23 has passed through the groove 14 and the lug 23 has been caused to fall into the slot 15 by rotating the connection shaft 20, the axially extending stop part 18 at least partially coincides with the lug in the axial direction of the connection shaft and is offset with respect to the lug 23 in the circumferential direction of the connection shaft, thereby blocking the lug 23 from re-entering the groove 14 during rotation of the connection shaft, and ensuring that the lug 23 will not come out of the groove 14.

According to a preferred embodiment of the present invention, the housing 10 comprises two halves, being split into the two halves at a center line position of the handle 11; during assembly of the power tool, the two halves are fitted together to form the housing 10. In the present invention, the mounting channel 12 and the holding part 13 are arranged on the two halves of the housing respectively, such that when the lug 23 of the connection shaft has first of all passed through the mounting channel 12 arranged on one of the halves, it extends into the holding part 13 arranged on the other half, the connection shaft 20 is rotated, causing the lug 23 to enter the slot 15 on an end face of the mounting channel 12 that faces toward the other half, then the two halves are joined; and with regard to the stop part 18 of the holding part arranged in the other half, due to the fact that the position of the axially extending stop part 18 corresponds to the position of the groove 14 of the mounting channel 12, the stop part 18 blocks the region axially in front of the groove 14 of the mounting channel 12. The elastic component 17 arranged between the first end 21 of the connection shaft 20 and the holding part 13 is compressed axially, and the biasing force thereof causes the lug of the connection shaft 20 to be held in the slot 15. Moreover, since the axially extending stop part 18 at least partially coincides with the lug 23 in the axial direction, the stop part 18 blocks the rotation angle of the lug 23 in the circumferential direction, thereby ensuring that the hook member is mounted to the power tool reliably and simply.

Referring to FIGS. 2-4, the hook member 24 comprises a handle part 25 and a hook part 26 extending from the handle part. The handle part 25 substantially comprises a straight longitudinal portion, used for attaching the hook member 24 to the second end 22 of the connection shaft 20. Preferably, the handle part 25 is connected at one end thereof to the second end 22 of the connection shaft by means of a pin 27, wherein the handle part 25 can rotate around the pin 27. The handle part 25 is substantially perpendicular to the connection shaft. The hook part 26 extends from one end of the handle part 25, and has a suitable hook shape for use in hanging of the tool. Preferably, the hook part 26 comprises a portion substantially parallel to the axis of the connection shaft 20 and a portion substantially perpendicular to the axis of the connection shaft 20; such a structural configuration of the hook part 26 facilitates secure and stable hanging.

Referring to FIGS. 1, 2, 5 and 6, the hook member of the present invention has a first position 41 and a second position 42 opposite the first position, wherein the first position 41 is the position of the hook member 24 when in a closed state thereof, that is to say, the first position 41 is the position of the hook member when the power tool does not need to be hung up by the hook member; for example, when the tool is being used, the user wishes that the hook member cause minimum hindrance to the use of the tool, and therefore, preferably, the first position 41 is below the front end of the handle 11, such that the hook member can be positioned near or adjacent to a body of the tool. When the hook member 24 needs to hang up the power tool, the hook member 24 must be moved to the second position 42 thereof; the second position 42 is an initial position of the hook member 24 when in an open state, and the second position 42 enables the hook member 24 to extend outward from the body of the tool to facilitate hanging of the tool. When the hook member 24 is in the initial position in the open state, it can rotate to a final position thereof around the central axis of the connection shaft 20.

Figure 5:
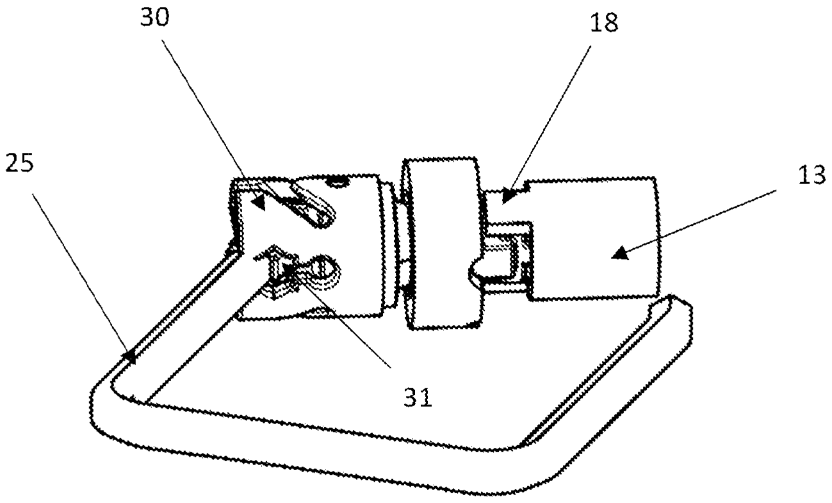
FIG. 5 is a schematic drawing of the hook assembly of the present invention in the process of moving from the first position to the second position.

According to an embodiment of the present invention, referring to FIGS. 1, 3 and 5, the hook member 24 is rotatable between the first position 41 and second position 42 thereof. Since the handle part 25 of the hook member 24 is connected to the second end 22 of the connection shaft 20 by means of the pin 27, the handle part 25 can rotate from the first position 41 to the second position 42 around the pin 27. More preferably, the first position 41 and second position 42 are centrosymmetric with respect to the pin 27, that is to say, the hook member 24 rotates through 180 degrees from the first position 41 to reach the second position 42. More preferably, the second end 22 of the connection shaft is provided with a narrow slot for accommodating the handle part; the narrow slot extends radially outward and is centered at the pin 27, and corresponds to the first position and/or second position of the hook member. According to another embodiment of the present invention, the hook assembly further comprises a support member 30; the support member 30 surrounds the second end 22 of the connection shaft 20 substantially in the circumferential direction, and the support member 30 has at least two limiting openings 31. The limiting opening 31 corresponds to the position of the narrow slot, and is configured to clamp the handle part 25 in the first position and/or second position. According to a preferred embodiment of the present invention, the support member 31 is a plastic member having certain degree of elasticity; the limiting opening 31 comprises a part for accommodating the handle part, and a slide groove slightly smaller than the size of the handle part. The limiting opening 31 is configured such that when the hook member 24 is at the first position, the handle part 25 is restricted in the opening, and will not randomly come out of the opening, but at the same time, when the handle part 25 is rotated from the first position 41 to the second position 42, the handle part can come out of the limiting opening 31 corresponding to the first position 41, and when the hook member 24 has rotated to the second position 42, the handle part can enter the limiting opening corresponding to the second position 42, and be restricted thereby, so as to avoid unnecessary rotation around the pin 27 when the hook member 24 is at the first position and/or second position.

Figure 6:
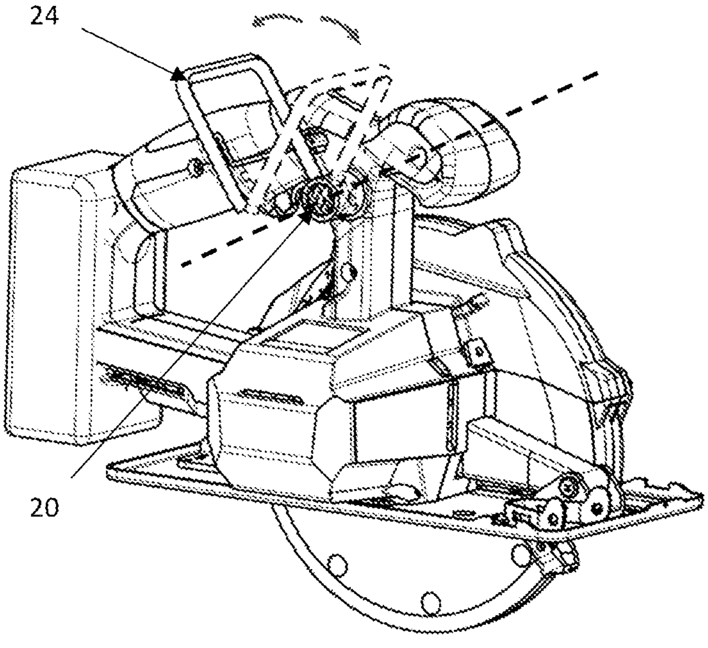
FIG. 6 is a schematic drawing of an operating state when the hook assembly of the present invention fitted onto a power tool is at the second position.
Figure 7:
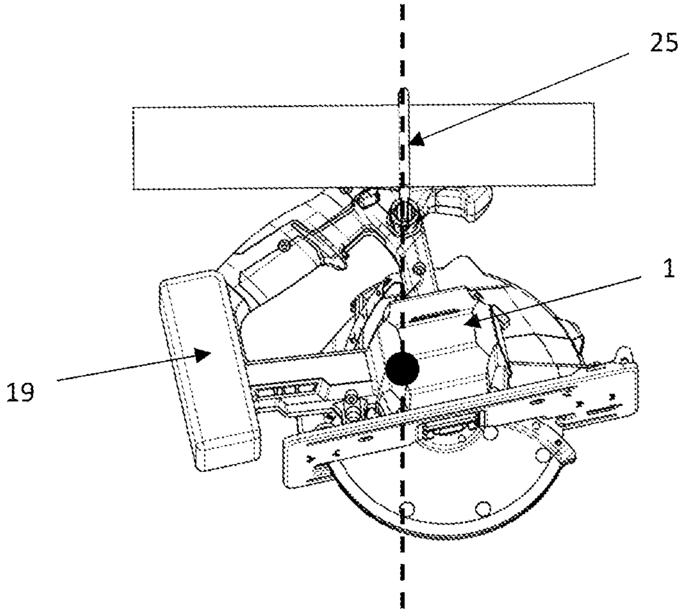
FIG. 7 is a schematic drawing of a power tool fitted with the hook assembly of the present invention when hung up.
Figure 8:
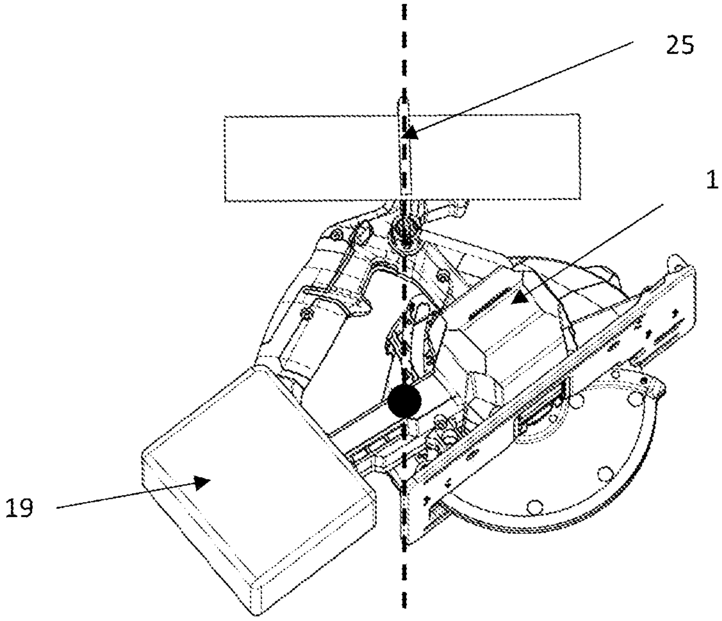
FIG. 8 is a schematic drawing of another power tool fitted with the hook assembly of the present invention when hung up.

Now referring to FIGS. 6-8, when the hook member 24 is rotated to the second position 42, since the connection shaft 23 is rotatable relative to the housing, the hook member 24 can further rotate to a desired angle around the central axis of the connection shaft 20. When the power tool is hung up, the hook part 26 is hung on a bar or hook; at this time, the weight of the power tool itself overcomes the biasing force generated by elastic component 17, such that the lug 23 of the connection shaft 20 slides out of the slot 15 on the end face of the mounting channel 12, and the connection shaft 20 rotates under the action of the weight of the tool, until the direction of the handle part 25 of the hook member 24 substantially coincides with the center of gravity of the power tool, at which time the hook assembly has the optimal hanging position and direction.

The hook assembly of the present invention can be integrated into the housing of the power tool, so that possible hindrance to the use of the tool is at a minimum, and can hang the tool in a desired position such as on another hook, protrusion, bar or other similar object when the tool is not in use, and automatically adjust to a mounted hanging position according to the center of gravity of the tool.

The present invention also provides a power tool, comprising a housing, the housing being connected to the hook assembly for a power tool according to any one of the preceding claims, the housing defining the center of gravity of the power tool, and the hook member substantially coinciding with the line of gravity of the power tool when the power tool is hung up. As shown in FIG. 7, when the power tool is equipped with a battery of lower weight, the center of gravity of the power tool is closer to the middle of the tool; in this case, when the hook assembly of the present invention hangs up the tool, the tool as a whole is closer to being horizontal. When the power tool is equipped with a battery of higher weight, as shown in FIG. 8, the center of gravity of the power tool moves toward the rear of the tool due to the increase in weight of the battery, and when the hook assembly of the present invention is used to hang up the tool, the tool is obviously tilted further toward the rear. The automatic adjustment of the hanging angle and/or direction according to the center of gravity of the power tool by means of the hook assembly of the present invention better ensures the safety, stability and convenience of tool hanging.

As stated above, although demonstrative embodiments of the present invention have already been explained herein with reference to the accompanying drawings, the present invention is not limited to the particular embodiments described above; many other embodiments are possible, and the scope of the present invention should be defined by the claims and their equivalent meaning.

The invention claimed is:

1. A power tool, comprising:

a housing; and a hook assembly for hanging the power tool, wherein the hook assembly has a connection shaft with a first end and a second end opposite each other, wherein the connection shaft is supported in a mounting channel of the housing, wherein the first end is disposed within a mounting hole of a holding part of the housing, wherein the second end is connected to a hook member, and wherein the hook member comprises a handle part and a hook part extending from the handle part;

wherein an elastic component is disposed between the first end of the connection shaft and a bottom of the mounting hole of the holding part of the housing;

wherein the hook member is rotatable between a first position and a second position opposite the first position, wherein the first position is a position of the hook member when in a closed state and when the power tool is in use, and wherein the second position is an initial position of the hook member when in an open state and when the power tool is not in use such that the hook member extends outward from a body of the power tool to facilitate hanging of the power tool;

wherein the handle part of the hook member is connected at a first end of the handle part to the second end of the connection shaft by a pin such that the handle part is rotatable from the first position to the second position around the pin;

wherein when the power tool hangs from the hook assembly, the hook member is further rotatable from the second position around a central axis of the connection shaft to a final position by a weight of the hanging power tool overcoming a biasing force generated by the elastic component such that a lug of the connection shaft between the first end of the connection shaft and the second end of the connection shaft slides out of a slot on an end face of the mounting channel of the housing and the connection shaft rotates under an action of the weight of the hanging power tool until a direction of the handle part of the hook member coincides with a center of gravity of the hanging power tool.

2. The power tool as claimed in claim 1, wherein the first position and second position are centrosymmetric with respect to the pin.

3. The power tool as claimed in claim 1, wherein a support member of the hook assembly surrounds the second end in a circumferential direction and wherein at least two limiting openings of the support member are respectively configured to clamp the handle part in the first position and/or the second position.

* * * * *